(12) United States Patent
Battaglia (10) Patent No.: US 10,400,445 B2
(45) Date of Patent: Sep. 3, 2019

(54) MULLION SEAL

(71) Applicant: STC Architectural Products, LLC, Buffalo, NY (US)

(72) Inventor: Paul L. Battaglia, Amherst, NY (US)

(73) Assignee: STC Architectural Products, LLC, Buffalo, NY (US)

( * ) Notice: Subject to any disclaimer, the term of this patent is extended or adjusted under 35 U.S.C. 154(b) by 0 days.

(21) Appl. No.: 15/422,720

(22) Filed: Feb. 2, 2017

(65) Prior Publication Data

US 2018/0216344 A1 Aug. 2, 2018

(51) Int. Cl.
*E04B 1/82* (2006.01)
*E04B 2/96* (2006.01)
(Continued)

(52) U.S. Cl.
CPC .......... *E04B 1/8209* (2013.01); *E04B 1/62* (2013.01); *E04B 1/84* (2013.01); *E04B 2/96* (2013.01);
(Continued)

(58) Field of Classification Search
CPC ...... E06B 1/62; E06B 2001/628; E06B 1/366; E06B 2003/6244; E04B 1/84;
(Continued)

(56) References Cited

U.S. PATENT DOCUMENTS 3,160,549 A * 12/1964 Caldwell ............... B32B 27/00
181/207
3,386,527 A * 6/1968 Daubert .................. E04B 1/82
181/208
(Continued)

FOREIGN PATENT DOCUMENTS

CH 703523 A1 * 1/2012 ............... E04B 1/36
DE 29621608 U1 * 1/1997 ............. E04B 2/965
(Continued)

OTHER PUBLICATIONS

Anonymous, "Emseal Expansion Joints and Pre-Compressed Sealants", Emseal Joint Systems Ltd., May 2016, 3 pages.
(Continued)

*Primary Examiner* — Robert Canfield
*Assistant Examiner* — Matthew J Gitlin
(74) *Attorney, Agent, or Firm* — Walter W. Duft (57) ABSTRACT

An acoustic seal for a sound flanking path between an an interior architectural separation and a mullion. The seal may be configured as an elongated rail having first and seal surfaces with adhesive elements disposed on laterally offset first and second adhesive-bearing portions thereof. When installed, the elongated rail can maintain a non-deformed state when opposing faces of the mullion and the architectural separation are separated by a distance equal to the elongated rail thickness. The elongated rail can assume a deformed state when the opposing faces of the mullion and the architectural separation are separated by a distance greater than the elongated rail thickness. In the deformed state, the longitudinal edges of the elongated rail become offset from each other in a direction normal to first and second seal surfaces. The elongated rail cross-section flexes proximate to first and second flex locations that may optionally include stress relief features.

21 Claims, 8 Drawing Sheets

(51) Int. Cl.
  *F16J 15/02* (2006.01)
  *E04B 1/84* (2006.01)
  *E04B 1/62* (2006.01)

(52) U.S. Cl.
  CPC .............. *E04B 2/967* (2013.01); *F16J 15/02* (2013.01); *E04B 2001/8254* (2013.01); *E04B 2001/8281* (2013.01); *Y10T 428/24479* (2015.01)

(58) Field of Classification Search
  CPC ............... E04B 1/8409; E04B 1/8209; E04B 2001/8281; E04B 1/6812; E04B 2/96; E04B 2/965; E04B 2/967; E04B 2/7409; E04B 2001/8263; E04B 2001/8272; E04F 19/02; F16J 15/02; F16J 15/15021; F16J 15/15022; F16J 15/15024; Y10T 428/24479; Y10T 428/24793; Y10T 428/24802; Y10T 428/2457
  USPC ..................... 52/717.03, 717.05, 235, 573.1
  See application file for complete search history.

(56) References Cited

U.S. PATENT DOCUMENTS

| | | | |
|---|---|---|---|
| 4,248,926 A * | 2/1981 | Tajima | B32B 11/02 442/90 |
| 4,462,190 A * | 7/1984 | Allen | E04D 13/1415 428/121 |
| 4,544,593 A * | 10/1985 | Borgert | E04B 1/66 428/80 |
| 4,655,009 A * | 4/1987 | DeGraan | E04D 13/1415 52/467 |
| 4,657,958 A * | 4/1987 | Fieldhouse | C09J 123/32 524/247 |
| 4,691,489 A | 9/1987 | Shea, Jr. | |
| 4,703,598 A | 11/1987 | Wilson et al. | |
| 4,798,035 A | 1/1989 | Mitchell | |
| 4,803,820 A | 2/1989 | Metrick | |
| 4,810,565 A * | 3/1989 | Wasitis | B32B 25/14 428/215 |
| 4,992,315 A * | 2/1991 | Zickell | B32B 11/02 428/40.3 |
| 5,018,333 A * | 5/1991 | Bruhm | E04D 13/031 52/200 |
| 5,076,035 A | 12/1991 | Wright | |
| 5,300,171 A * | 4/1994 | Braun | C09J 183/04 156/249 |
| 5,899,026 A * | 5/1999 | Williams | E04D 1/36 52/58 |
| 6,351,915 B1 | 3/2002 | Puckett | |
| 6,945,000 B1 * | 9/2005 | Hohmann | B32B 25/10 428/295.1 |
| 8,541,084 B2 | 9/2013 | Deiss et al. | |
| 8,572,914 B2 | 11/2013 | Burgess | |
| 8,997,414 B2 | 4/2015 | Fletcher | |
| 9,797,131 B1 | 10/2017 | Battaglia | |
| 2003/0216097 A1 * | 11/2003 | Schmid | E06B 1/62 442/381 |
| 2006/0137262 A1 | 6/2006 | Crowder-Moore et al. | |
| 2007/0125011 A1 | 6/2007 | Weir | |
| 2007/0193126 A1 * | 8/2007 | Teodorovich | E04D 1/36 52/58 |
| 2008/0141597 A1 * | 6/2008 | O'Rourke | E06B 1/62 52/62 |
| 2009/0229193 A1 * | 9/2009 | Ellingson | E06B 1/62 52/58 |
| 2010/0101161 A1 * | 4/2010 | Dudash | E06B 1/62 52/202 |
| 2012/0103722 A1 * | 5/2012 | Clausi | B32B 25/14 181/294 |
| 2016/0145857 A1 * | 5/2016 | Dreyer | E06B 1/62 52/61 |

FOREIGN PATENT DOCUMENTS

| | | | | |
|---|---|---|---|---|
| DE | 10147692 A1 | * | 4/2002 | ............ E04B 1/82 |
| DE | 10055865 A1 | * | 6/2002 | ............ E06B 1/62 |
| DE | 10255598 A1 | | 7/2003 | |
| DE | 20306438 U1 | * | 7/2003 | ............ E06B 1/62 |
| DE | 10310621 A1 | * | 9/2004 | ............ E04F 19/02 |
| DE | 102004012473 A1 | | 10/2005 | |
| DE | 202005004044 A1 | | 7/2006 | |
| DE | 102005057153 A1 | * | 5/2007 | .......... A47B 95/002 |
| DE | 102007021680 A1 | * | 5/2008 | ............ E04F 13/06 |
| DE | 102007021680 A1 | * | 5/2008 | ............ E04F 13/06 |
| DE | 102007009945 A1 | * | 9/2008 | ............ E06B 1/62 |
| DE | 102007009945 A1 | * | 9/2008 | ............ E06B 1/62 |
| DE | 202010008330 U1 | * | 11/2011 | .......... E04B 1/6812 |
| DE | 102012101989 A1 | * | 9/2012 | .......... E04B 1/6812 |
| EP | 1213430 A2 | * | 6/2002 | ............ E06B 1/62 |
| EP | 1674651 A2 | * | 6/2006 | ............ E06B 5/164 |
| EP | 1992776 A2 | | 11/2008 | |
| EP | 2423396 A2 | * | 2/2012 | .......... E04B 1/6812 |
| EP | 2089595 B1 | | 8/2012 | |
| FR | 2514103 A1 | * | 4/1983 | ............ B21D 11/08 |
| NL | 1005170 C2 | * | 8/1998 | .......... E04B 2/7409 |
| NL | 1005170 C2 | * | 8/1998 | .......... E04B 2/7409 |

OTHER PUBLICATIONS

Anonymous, "Mull It Over", Mull It Over Products, Aug. 2012, 1 page.

* cited by examiner

MULLION SEAL

BACKGROUND

1. Field

The present disclosure relates to sound suppression and acoustical privacy in architectural structures. More particularly, the disclosure is directed to noise attenuation in flanking paths between the ends of interior separations and mullions in curtain wall and storefront constructions.

2. Description of the Prior Art

By way of background, commercial building codes typically impose acoustic privacy restrictions that limit the amount of noise permitted to pass through interior separations. For example, section 1207.2 of the International Building Code (IBC) imposes the following requirement for air-borne sound:

"Walls, partitions and floor/ceiling assemblies separating dwelling units from each other or from public or service areas shall have a sound transmission class (STC) of not less than 50 (45 if field tested) for air-borne noise when tested in accordance with ASTM E 90."

In curtain wall and storefront constructions, unsealed interfaces between the ends of interior separations and the exterior mullions produce "flanking paths" for air-borne sound that may severely compromise the transmission loss intended for the separation. The sound that invades through such flanking paths compromises the acoustic integrity of the separations irrespective of the acoustic attenuation qualities of the separation structures themselves. Applicant submits that this issue needs to be addressed if adequate levels of privacy and confidentiality are to be attained.

SUMMARY

In a first aspect, an acoustic seal is provided for sealing a sound flanking path between an interior architectural separation and a mullion. The acoustic seal may include a seal body that includes an elastomeric acoustic isolating material. The seal body may be configured as an elongated rail having a length and a cross-section defined by a width and a thickness of the elongated rail.

The elongated rail may have two substantially planar and mutually parallel sides spaced from each other by a distance that defines the elongated rail thickness. The elongated rail may have two longitudinal edges spaced from each other by a distance that defines the elongated rail width. A first one of the sides may define a first seal surface arranged to engage a first interior side of the mullion. A second one of the sides may define a second seal surface arranged to engage an end wall of the interior architectural separation.

A first adhesive element may be disposed on the first seal surface at a first adhesive-bearing portion of the elongated rail. A second adhesive element may be disposed on the second seal surface at a second adhesive-bearing portion of the elongated rail. The first and second seal body adhesive-bearing portions may be separated from each other by a mid-span region of the elongated rail cross-section. The first and second seal body adhesive-bearing portions may be laterally offset from each another, with the first seal body adhesive-bearing portion being proximate to a first one of the elongated rail longitudinal edges and the second seal body adhesive-bearing portion being proximate to a second one of the elongated rail longitudinal edges.

The elongated rail may be attachable to opposing faces of the mullion and an end wall of the architectural separation by adhering the first adhesive element to a face of the mullion and by adhering the second adhesive element to a face of the architectural separation end wall. The elongated rail may maintain a non-deformed state when it is attached to the mullion and the architectural separation end wall with the opposing faces of the mullion and the architectural separation end wall being separated by a distance that equals the elongated rail thickness. The elongated rail may assume a deformed state when it is attached to the mullion and the architectural separation end wall with the opposing faces of the mullion and the architectural separation end wall being separated by a distance that is greater than the elongated rail thickness. The deformed state may include the first and second elongated rail longitudinal edges becoming offset from each other in a direction normal to the first and second seal surfaces, and the elongated rail cross-section becoming flexed proximate to first and second flex locations where the mid-span region of the elongated rail cross-section meets the first and second elongated rail adhesive-bearing portions.

In embodiment, the first and second adhesive elements may include first and second adhesive strips.

In an embodiment, each of the first and second adhesive strips may extend along the entire length of the elongated rail.

In an embodiment, the acoustic seal may further include first and second stress-relief features disposed at the first and second flex locations.

In an embodiment, the first and second stress-relief features may include slits extending partially through the elongated rail thickness.

In an embodiment, the slits extend through approximately half of the elongated rail thickness.

In an embodiment, the first and second stress-relief features may include notches extending partially through the elongated rail thickness.

In a second aspect of the disclosure, an architectural assembly may include an interior architectural separation, a mullion, and an acoustic seal as summarized above sealing a sound flanking path between an end wall of the interior architectural separation and the mullion.

In a third aspect of the disclosure, an architectural assembly construction method may include providing an acoustic seal as summarized above for sealing a sound flanking path between an interior architectural separation and a mullion. The acoustic seal may be attached to the mullion with the first adhesive element engaging an opposing face of the mullion. An end wall of an interior architectural separation may be attached to the acoustic seal with the second adhesive element engaging an opposing face of the end wall.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
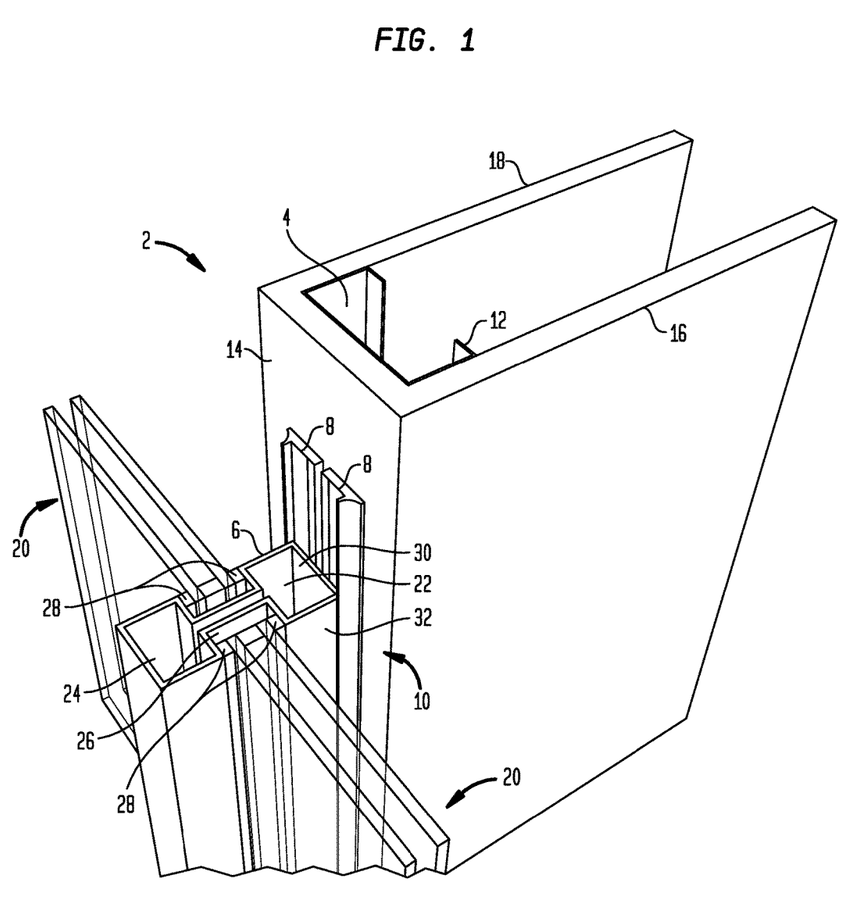
FIG. 1 is a fragmentary perspective view showing an example architectural assembly having an interior architectural separation, a curtain wall or storefront mullion, and an acoustic seal arrangement sealing a sound flanking path between an end of the architectural separation and an interior face of the mullion.

Turning now to the drawing figures, which are not necessarily to scale, like reference numbers are used to indicate like structure in all of the several views. FIG. 1 illustrates an architectural assembly 2 constructed in accordance with an example embodiment of the present disclosure. In the illustrated embodiment, the assembly 2 includes an interior architectural separation 4, a curtain wall or storefront mullion 6, and a pair of acoustic seals 8 for sealing a sound flanking path 10 between the interior architectural separation and the mullion.

The architectural separation 4 may be of any suitable construction. In the illustrated embodiment, the architectural separation 4 is a metal frame vertical wall structure onto which sheets of drywall (a.k.a, gypsum board, wallboard, plasterboard) are mounted. In FIG. 1, only one end of the architectural separation 4 is shown, namely, the end that faces the mullion 6. At this end of the architectural separation 4, a vertical end stud 12 supports a narrow drywall sheet that defines an interior end wall 14 of the architectural separation. The end stud 12 additionally supports two drywall sheets that define respective first and second sidewalls 16 and 18 of the architectural separation. For ease of description, other structural elements that may be present in the architectural separation 4, such as additional wall studs, top and bottom plates, etc., are omitted from FIG. 1.

The mullion 6 may be of any suitable construction. In the illustrated embodiment, the mullion 6 is a frame structure, made from metal or other suitable material, that supports the opposing ends of a pair of glass sheet assemblies 20. The mullion 6 may include an interior member 22, an exterior member 24 and an intermediate member 26. Seal members 28 may be used to seal the ends of the glass sheet assemblies 20 to the mullion 6.

Of interest to the present discussion is the mullion's interior member 22, which may be of any suitable shape and construction. FIG. 1 illustrates one possible design in which the interior member 22 is of generally rectangular or similar shape, and may have either a tube-like (as shown) or solid construction. In the illustrated embodiment, the mullion interior member 22 defines a first interior side 30 of the mullion that opposes the end wall 10 of the architectural separation 4. The mullion interior member 22 also defines a pair of second interior sides 32 that extend from the edges of the first interior side 30, away from the end wall 14 of the architectural separation 4. The angles between the first interior side 30 and the second interior interior sides 32 are shown in FIG. 1 as being approximately 90 degrees (perpendicular). However, this is for purposes of illustration only, and it will be appreciated that other angles may be used.

Figure 2:
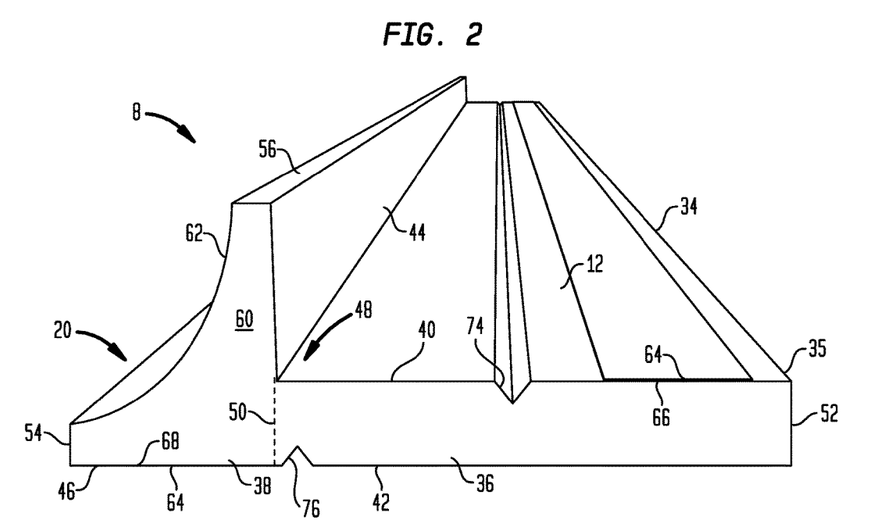
FIG. 2 is a top perspective view of an acoustic seal that may be used in the architectural assembly of FIG. 1.
Figure 3:
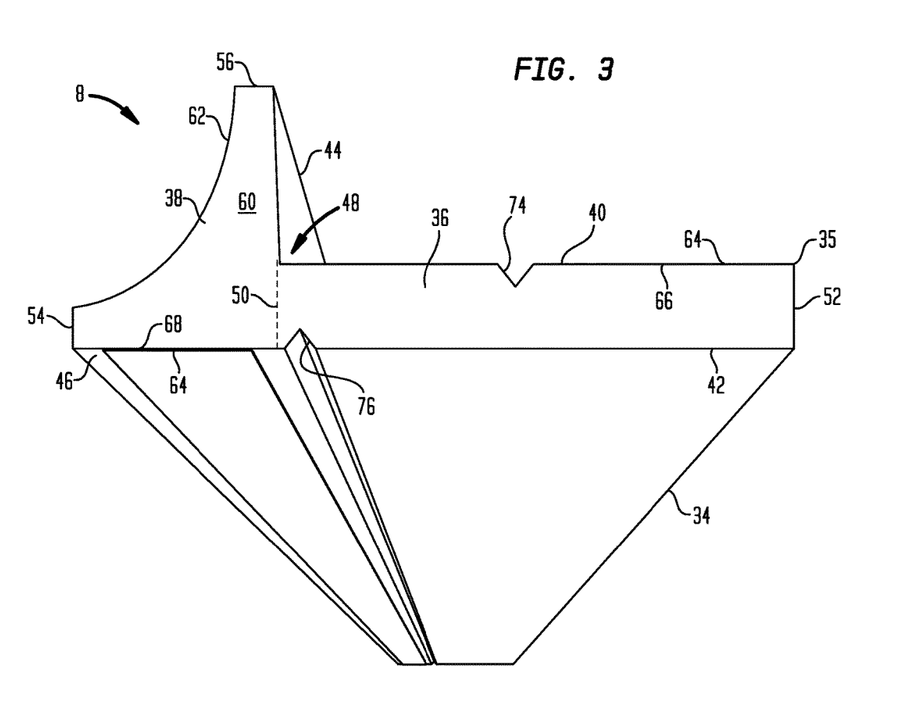
FIG. 3 is a bottom perspective view of the acoustic seal of FIG. 2.

With additional reference now to FIGS. 2 and 3, each acoustic seal 8 may include a seal body 34 that may be formed entirely from an elastomeric acoustic isolating material. Example materials include, but are not limited to, solid neoprene rubber having sufficient flexibility to allow the acoustic seal 8 to flex in the manner to be described below in connection with FIGS. 4 and 5. The acoustic seals 8 may be produced in a variety of colors, including but not limited to white, black, aluminum gray, etc.

The seal body 34 may be configured as an elongated rail 35 that may be extruded, molded or otherwise formed. The elongated length of the seal body 34 is a matter of design choice, but it may be advantageous to form the seal body into long lengths that can be wound into rolls and field-cut or trimmed to size at a construction job site to the actual lengths required. Alternatively, the seal body 34 could be produced in lengths that are compatible with a standard architectural floor-to-ceiling dimension, such as 8 ft., 10 ft., 12 ft., etc. For example, the seal body 34 could be any of the foregoing lengths, a multiple of such lengths, or a fraction of such lengths. It will be appreciated that if the seal body 34 is longer than the length needed for the architectural assembly 2, the seal body may be field-cut as needed. Similarly, if the seal body 34 is shorter than the length need for the architectural assembly 2, two or more acoustic seals 8 may be combined in a single run of such seals. However, care should be taken to avoid gaps between adjacent seals so as not to compromise acoustic isolation integrity.

The seal body 34 may include a base rail portion 36 and a side rail portion 38. The base rail portion 36 may have two substantially planar and mutually parallel base rail sides, one defining a first seal surface 40 arranged to engage the first interior side 30 of the mullion 6, the other defining a second seal surface 42 arranged to engage the end wall 14 of the architectural separation 4.

The side rail portion 38 may have two substantially planar and mutually non-parallel side rail sides, one defining a third seal surface 44 that is substantially non-parallel (e.g., perpendicular) to the first seal surface 40 and arranged to engage one of the second interior sides 32 of the mullion 6, the other defining a fourth seal surface 46 that is in substantially coplanar relationship with the second seal surface 42 and arranged to engage the end wall 10 of the architectural separation 4.

The first seal surface 40 and the third seal surface 44 may form an inside corner 48 of the acoustic seal 8 that is arranged to envelop an outside corner of the mullion 6 defined by the first interior side 30 of the mullion and one of its second interior sides 32. The angle of the inside corner 48 may be selected to correspond to the angle between the first and second interior sides 30 and 32 of the mullion 6, thereby providing a tight fit with good acoustic isolation properties. In the illustrated embodiment, the inside corner 48 is lies at the intersection of the first and third seal surfaces 40 and 44 at a laterally interior region 50 of the seal body 34. The laterally interior region 50 may be thought of as the location at which the base rail portion 36 meets and merges with the side rail 38, it being understood that both rail portions may be formed as part of a common integral structure. It will be appreciated that the configuration of the inside corner 48 may be square, filleted, (e.g., with a chamfer or radius) or otherwise defined to accommodate the outside corner profile of the mullion 6.

The base rail portion 36 may have a base rail free edge 52 that defines a first longitudinal edge of the elongated rail 35. The first and second seal surfaces 40 and 42 may extend from the laterally interior region 50 of the seal body 34 to the first base rail free edge 52. The side rail portion 38 may have a first side rail free edge 54 that defines a second longitudinal edge of the elongated rail 35. The fourth seal surface 46 may extend from the laterally interior region 50 of the seal body 34 to the first side rail free edge 54. The third seal surface 44 may extend from the inside seal corner 48 to a second side rail free edge 56 that defines a longitudinal edge of a flange portion 60 of the elongated rail 35.

If desired, the side rail portion 38 may be configured to have an angled surface 62 extending between the first and second side rail free edges 54 and 56, such that the side rail portion functions as an architectural molding. In the illustrated embodiment, the angled surface 62 is curved, with the curvature being concave so as to provide a cove molding configuration. In other embodiments, the angled surface could be formed with a convex curvature so as to provide a round molding configuration. Other configurations could also be used.

As can be seen in FIGS. 2 and 3, adhesive elements 64 may be disposed on respective first and second adhesive-bearing portions 66 and 68 of the first seal surface 40 and the fourth seal surface 46. The adhesive elements 64 may be provided in the form of double-sided adhesive strips (e.g., with peel-off backing layers), or in any other suitable manner (including as quantities of liquid adhesive applied immediately prior to acoustic seal installation). As shown in FIGS. 2 and 3, the adhesive elements 64 may extend continuously along the length of the elongated rail 35. Alternatively, the adhesive elements 64 could be intermittent. The first and second adhesive-bearing portions 66 and 68 are laterally offset from each another. This provides an advantageous feature of the acoustic seal 8 that accommodates relative movement between the interior architectural separation 4 and the mullion 6 that produces changes in spacing between the end wall 14 of the interior architectural separation 4 and the first interior side 30 of the mullion.

Figure 4:
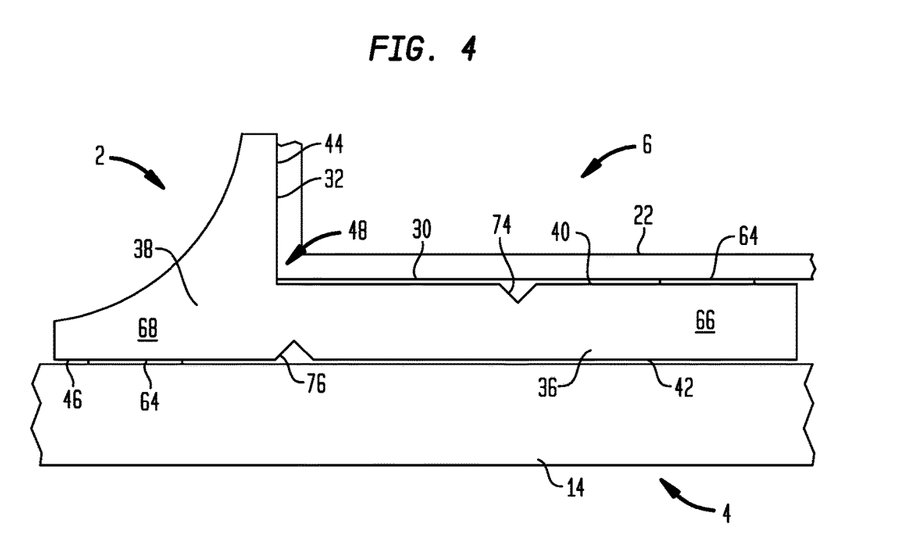
FIG. 4 is a fragmentary end view of the architectural assembly of FIG. 1.
Figure 5:
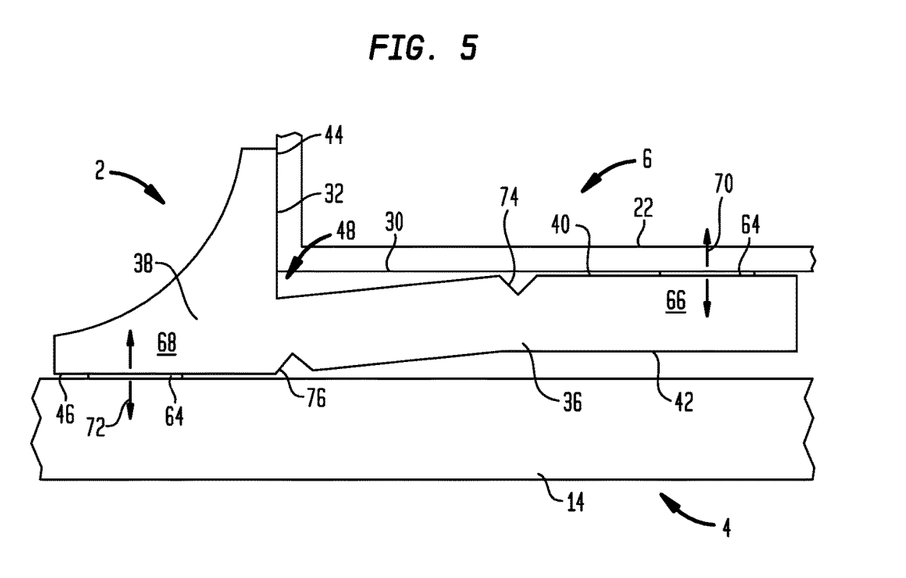
FIG. 5 is a fragmentary end view according to FIG. 4, and showing flexing of the acoustic seal of the architectural assembly due to relative movement between the architectural separation and the mullion.

FIGS. 4 and 5 are illustrative. In FIG. 4, the architectural assembly 2 is shown in a default state in which the end wall 14 of the architectural separation 4 and the first interior side 30 of the mullion 6 have a nominal spacing. This will likely be the spacing that exists when the acoustic seals 8 are initially installed in the architectural assembly 2. In FIG. 5, the architectural assembly 2 is shown in a deflected state following relative movement between the architectural separation 4 and the mullion 6 that increases the spacing between the end wall 14 of the architectural separation and the first interior side 30 of the mullion. This relative movement could be due to several factors, such as expansion, contraction, deflection or drift of the mullion 6.

It will be seen in FIG. 5 that the acoustic seal 8 is capable of undergoing offset flexing that allows the base rail portion 36 to displace relative to the side rail section 38. Due to the adhesive elements 64, the first seal surface 40 remains attached to and travels with the first interior side 30 of the mullion 6, and the fourth seal surface 46 remains attached to and travels with the end wall 14 of the architectural separation 4. The arrows 70 and 72 illustrate the applied loads that develop on the acoustic seal 2 as the architectural separation 4 and the mullion 6 move away from each other. The relatively low elastic modulus of the acoustic seal material allows the acoustic seal 2 to undergo offset flexing without undue resistance.

To further facilitate offset flexing of the base rail portion 36 and the side rail portion 38, a pair of first and second channels 74 and 76 serves as stress relief features that may be provided in the acoustic seal 8. The first channel 74 may be formed in the first seal surface 40 between the first adhesive-bearing portion 66 and the interior corner 52. The second channel 76 may be formed in the second seal surface 42 proximate to the laterally interior region 50 representing the area of intersection between the second seal surface and the fourth seal surface 46. The first and second channels 74 and 76 may be configured in any suitable manner that facilitate the offset flexing. For example, in the illustrated embodiment, the first and second channels 70 and 72 are configured as V-shaped notches. Other channel configurations, such as slits, could also be used.

An advantage of constructing the acoustic seal 8 to undergo offset flexing is that the architectural separation 4 and the mullion 6 are allowed to move apart without the applied loads 70 and 72 on the adhesive 64 becoming excessive. Due to the elastic modulus of the acoustic seal material, the offset distance between the adhesive-bearing portions 66 and 68, and the flexibility-enhancing properties of the channels 74 and 76, the applied loads 70 and 72 remain relatively low. In contrast, if the adhesive-bearing portions 66 and 68 were not laterally offset, and instead were laterally aligned, any structural movement tending to increase the spacing between the architectural separation 4 and the mullion 6 would quickly produce large applied loads that would likely result in adhesive failure.

Returning now to FIG. 1, the architectural assembly 2 may be constructed according an example method now to be described. According to this method, a pair of the acoustic seals 8 may be provided, such as by bringing or delivering the seals to the construction job site. If necessary, the acoustic seals 8 may be cut or trimmed to length and pre-fit on both interior corners of the mullion interior member 22. The side rail portion 38 of the seal body 34 may be trimmed away (e.g., at the laterally intermediate region 50) at the head, sill and intermediate horizontal mullions (if present) of the curtain or storefront wall, to provide a tight fit. The acoustic seals 8 may be mounted on the mullion 8 with the first sealing surface 40 of each seal facing the first interior side 30 of the mullion and the third sealing surface 44 facing one of the mullion's second interior sides 32. The acoustic seals 8 may secured to the mullion 6 using the adhesive element 64 located at the adhesive-bearing location 66.

If the adhesive element 64 at the adhesive-bearing location 66 is in the form of an adhesive strip, one side may already be adhered to the acoustic seals 8, and the seals may be attached to the mullion 6 by removing a peel-off backing (if present) from the other side of the adhesive strip prior to pressing the seals onto the mullion. Alternatively, if an adhesive strip is not already attached to the acoustic seals 8 at the adhesive-bearing location 66, a pair of adhesive strips could first be applied to either the seals or the mullion 6, and the seals could then be pressed onto the mullion. Once the acoustic seals 8 are in place, the end wall of the architectural separation 4 may be mounted to the seals, with the end wall 14 thereof facing the first and fourth sealing surfaces 40 and 46 of the seals.

One way to construct the architectural separation 4 is to form an assembly consisting of the drywall piece that forms the end wall 14 and the end stud 12. Before attaching this assembly to the top and bottom plates of the architectural separation, the assembly may be mounted to the acoustic seals 8, with the end wall 14 facing the second and fourth sealing surfaces 42 and 46. The acoustic seals 8 may secured to the end wall 14 using the adhesive element 64 located at the adhesive-bearing location 68.

If the adhesive element 64 at the adhesive-bearing location 68 is in the form of an adhesive strip, one side may already be adhered to the acoustic seals 8, and the seals may be attached to the end wall 14 by removing a peel-off backing (if present) from the other side of the adhesive strip prior to pressing the seals onto the end wall. Alternatively, if an adhesive strip is not already attached to the acoustic seals 8 at the adhesive-bearing location 68, a pair of adhesive strips could first be applied to either the seals or the end wall 14, and the end wall 14 could then be pressed onto the seals.

Once the end wall 14 is mounted to the acoustic seals 8, the end stud 12 may be attached to the top and bottom plates of the architectural separation 4. The drywall pieces that form the side walls 16 and 18 of the architectural separation 4 may then be installed onto the end stud 12 and the other framing elements (not shown) used to support the drywall.

Once the architectural assembly 2 is complete, the flanking path 10 will be acoustically blocked by the acoustic seals 8, improving STC performance in comparison to an untreated joint. Cosmetically, the only visible component of the acoustic seals 8 will be the angled surface 62 that may be curved to appear as a molding.

Figure 6:
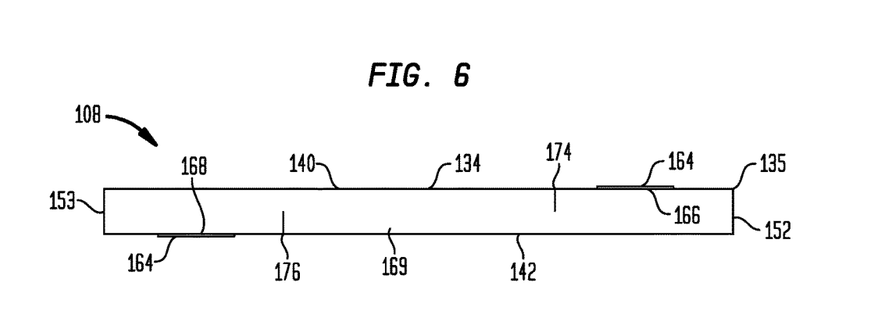
FIG. 6 is an end view of a first alternative acoustic seal that may be used in an architectural assembly to seal a sound flanking path between an the end of an interior architectural separation and an interior face of a curtain wall or storefront mullion.
Figure 7:
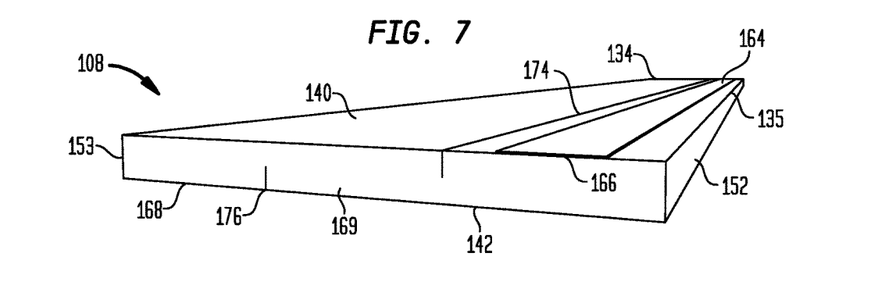
FIG. 7 is a top perspective view of the first alternative acoustic seal of FIG. 6.
Figure 8:
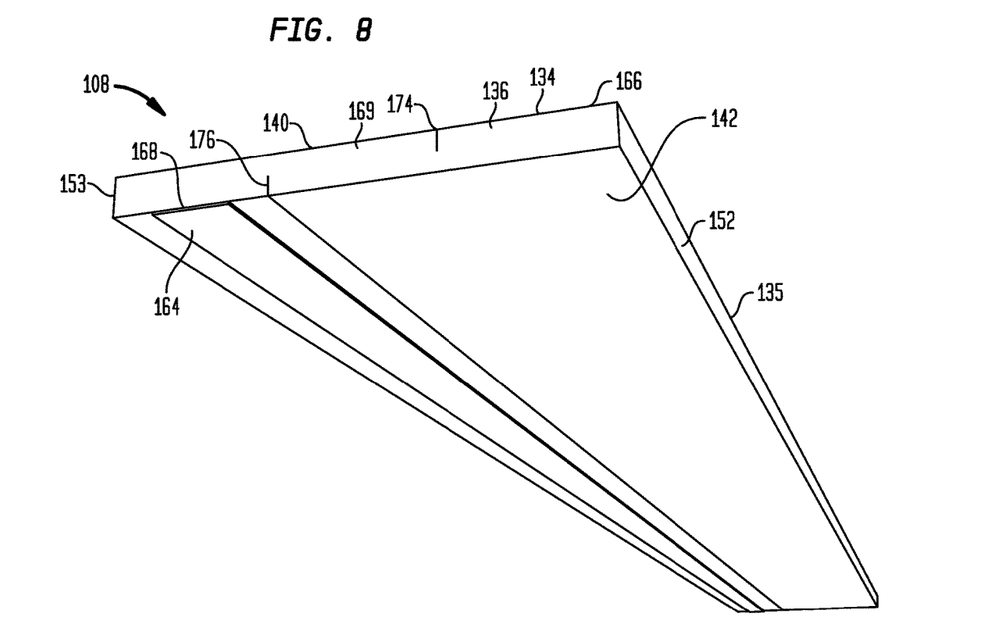
FIG. 8 is a bottom perspective view of the first alternative acoustic seal of FIG. 6.

Turning now to FIGS. 6-8, a first alternative acoustic seal 108 is shown that may be used to seal a sound flanking path between the end of an interior architectural separation and an interior face of a curtain wall or storefront mullion. The acoustic seal 108 has a number of similarities to the acoustic seal 8 described above, and these similarities are shown by the use of corresponding reference numbers incremented by 100. For example, the acoustic seal 108 may include a seal body 134 that may be formed entirely from the same elastomeric acoustic isolating material as the acoustic seal 8. Such materials include, but are not limited to, solid neoprene rubber having sufficient flexibility to allow the acoustic seal 108 to flex in the manner described below in connection with FIGS. 9 and 10. Like the acoustic seal 8, the acoustic seal 108 may be produced in a variety of colors, including but not limited to white, black, aluminum gray, etc.

The seal body 134 may be configured as an elongated rail 135 that may be extruded, molded or otherwise formed. As in the case of the acoustic seal 8, the length of the seal body 134 is a matter of design choice, but it may be advantageous to form the seal body into long lengths that can be wound into rolls and field-cut or trimmed to size at a construction job site to the actual lengths required. Alternatively, the seal body 134 could be produced in lengths that are compatible with standard architectural floor-to-ceiling dimensions, such as 8 ft., 10 ft., 12 ft., etc. For example, the seal body 134 could be any of the foregoing lengths, a multiple of such lengths, or a fraction of such lengths. It will be appreciated that if the seal body 134 is longer than the length needed for an architectural assembly, the seal body may be field-cut as needed. Similarly, if the seal body 134 is shorter than the length need for an architectural assembly, two or more acoustic seals 108 may be combined in a single run of such seals. However, care should be taken to avoid gaps between adjacent seals so as not to compromise acoustic isolation integrity.

Unlike the acoustic seal 108, which has a base rail portion 36 and a side rail portion 38, the acoustic seal 108 has no side rail. There is only a single base rail portion that represents the entirety of the elongated rail 135. As shown in FIG. 6, the elongated rail 135 may have a generally rectangular cross-section defined by a width and a thickness of the elongated rail. The elongated rail 135 may have two substantially planar and mutually parallel sides, one defining a first seal surface 140 arranged to engage the interior side of the mullion, the other defining a second seal surface 142 arranged to engage the end wall of an architectural separation. The distance between the parallel sides that define the first and second seal surfaces 140 and 142 represents the thickness of the elongated rail cross-section. The elongated rail 135 may also have first and second longitudinal edges 152 and 153. The distance between the longitudinal edges 152 and 153 represents the width of the elongated rail cross-section.

In example embodiments, the width dimension of the elongated rail 135 may be many times less than the length dimension, and the thickness dimension may be many time less than the width dimension. As noted above, the elongated rail 135 may have an elongated length dimension (shown in FIGS. 7 and 8) that may be on the order of many feet. By way of example only, and not by way of limitation, the elongated rail 135 may have a width dimension of between approximately 1-3.5 inches, with 1.75 inches being typical, and a thickness dimension of between approximately 0.0625-0.25 inches, with 0.125 inches being typical.

Adhesive elements 164 may be disposed on respective first and second adhesive-bearing portions 166 and 168 of the first and second seal surface 140 and 146. Each adhesive element 164 may be provided in the form of double-sided adhesive strips (e.g., with peel-off backing layers), or in any other suitable manner (including as quantities of liquid adhesive applied immediately prior to acoustic seal installation). As shown in FIGS. 7 and 8, the adhesive elements 164 may extend continuously along the length of the elongated rail 135. Alternatively, the adhesive elements 164 could be intermittent.

The first and second adhesive-bearing portions 166 and 168 are laterally offset from each another and proximate to respective ones of the longitudinal edges 152 and 153. The adhesive-bearing portions 166 and 168 are separated by a mid-span region 169 of the elongated rail cross-section. This provides an advantageous feature of the acoustic seal 108 that accommodates relative movement between an interior architectural separation and a mullion that produces changes in spacing between these two structures. To further facilitate such offset flexing, the acoustic seal 108 may be additionally formed with stress relief features, such as a pair of laterally offset first and second slits 174 and 176. The first slit 174 may be formed in the first seal surface 140 at a flex location (see below) where the mid-span region 169 of the elongated rail cross-section meets the first adhesive-bearing portion 166. The second slit 176 may be formed in the second seal surface 142 at a flex location (see below) where the mid-span region 169 of the elongated rail cross-section meets the second adhesive-bearing portion 168. The slits 174 and 176 may be formed in any suitable manner, such as by cutting the longitudinal rail 135 after it is formed.

The first and second slits 174 and 176 may have a depth that is sufficient to facilitate the acoustic seal's offset flexing. For example, in the illustrated embodiment, the first and second slits 174 and 176 extend approximately halfway through the thickness of the seal body 134. Each slit 174 and 176 may be spaced from the edge of the adjacent adhesive element 164 by the same distance that the other edge of the adhesive element is from the closest longitudinal edge 152 or 153. In that way, each adhesive element 164 will be centered between a longitudinal slit and a longitudinal edge. For example, if the adhesive element 164 on the adhesive-bearing portion 166 is ⅛ inches away from the longitudinal edge 152, the slit 174 could be ⅛ inches away from the adhesive. The other adhesive element 164 could be similarly centered between the slit 176 and the longitudinal edge 153.

Figure 9:
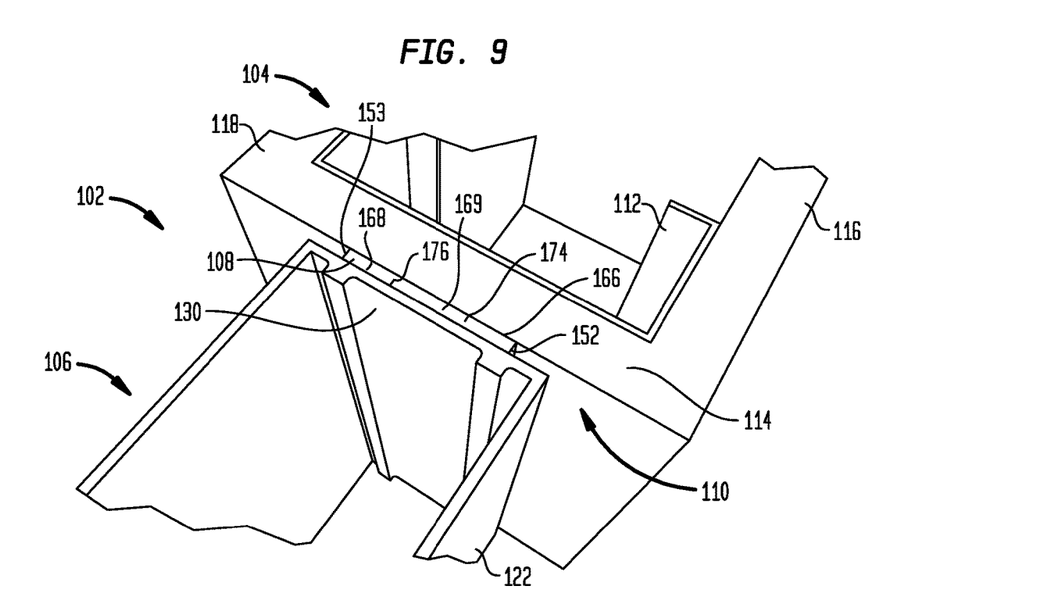
FIG. 9 is a fragmentary perspective view showing an architectural assembly in which the first alternative acoustic seal of FIG. 6 is installed to seal a sound flanking path between the end of an interior architectural separation and an interior face of a curtain wall or storefront mullion.
Figure 10:
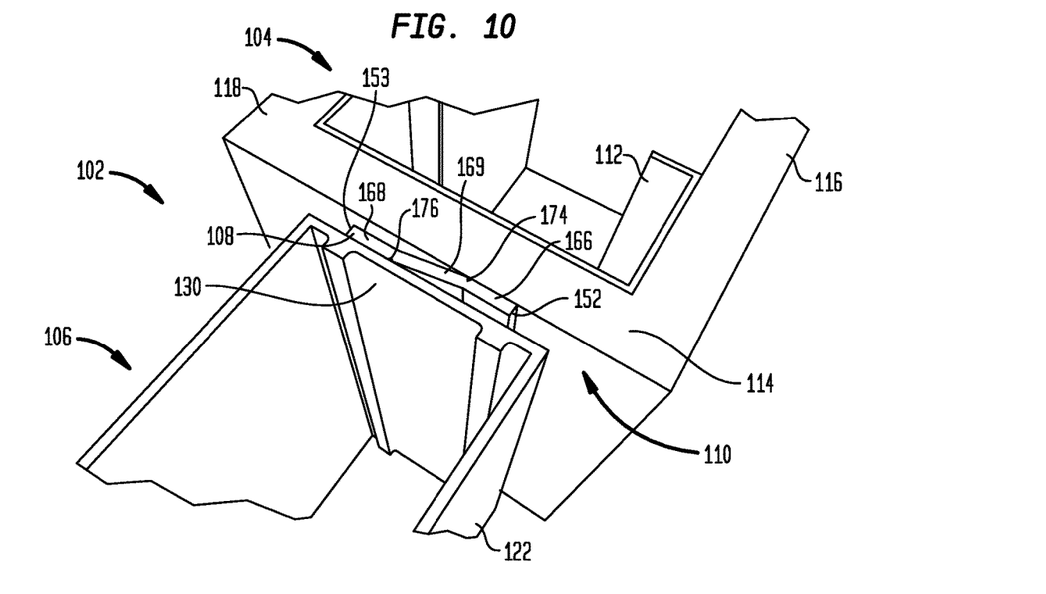
FIG. 10 is a fragmentary view of the architectural assembly of FIG. 9 in which the interior face of the mullion has displaced away from the interior architectural separation, and with the first alternative acoustic seal flexing to accommodate the displacement.

Turning now to FIGS. 9 and 10, the ability of the acoustic seal 108 to flex following installation is illustrated. FIGS. 9 and 10 depict an architectural assembly 102 that is substantially similar the architectural assembly 2 of FIG. 1, as shown by the use of corresponding reference numbers incremented by 100. The assembly 102 includes an interior architectural separation 104, a curtain wall or storefront mullion 106, and the acoustic seal 108 for sealing a sound flanking path 110 between the interior architectural separation and the mullion. It will be noted that only a single instance of the acoustic seal 108 blocks the sound flanking path 110 in the path traversal direction. By comparison, two acoustic seals 8 were used in the architectural assembly 2, but this was due to the fact that the acoustic seals 8 also provided an architectural molding feature on each side of the mullion 6. Because the acoustic seal 108 lacks a side rail molding, only one instance thereof is needed in the flanking path traversal direction. It will be appreciated that the acoustic seal 108 may be installed between the architectural separation 104 and the mullion 106 in essentially the same manner as previously described in connection with the acoustic seal 8.

The architectural separation 104 may have the same construction as the architectural separation 4 of FIG. 1. In the illustrated embodiment, the architectural separation 104 has a metal frame vertical wall structure onto which sheets of drywall (a.k.a, gypsum board, wallboard, plasterboard) are mounted. In FIGS. 9 and 10, only one end of the architectural separation 104 is shown, namely, the end that faces the mullion 106. At this end of the architectural separation 104, a vertical end stud 112 supports a narrow drywall sheet that defines an interior end wall 114 of the architectural separation. The end stud 112 additionally supports two drywall sheets that define respective first and second sidewalls 116 and 118 of the architectural separation 104. For ease of description, other structural elements that may be present in the architectural separation 104, such as additional wall studs, top and bottom plates, etc., are omitted from FIGS. 9 and 10.

The mullion 106 may be of any suitable construction. In the illustrated embodiment, the mullion 106 is a frame structure, made from metal or other suitable material, that supports the opposing ends of a pair of glass sheet assemblies (not shown). Additional details of the mullion 106 correspond to the mullion 6 of FIG. 1, and will not be repeated here.

Of interest to the present discussion is the mullion's interior member 122, which may be of any suitable shape and construction. FIGS. 9 and 10 illustrates one possible design in which the interior member 122 is of generally rectangular or similar shape, and may have either a tube-like (as shown) or solid construction. In the illustrated embodiment, the mullion interior member 122 defines a first interior side 130 of the mullion that opposes the end wall 114 of the architectural separation 104.

The sole difference between the architectural assembly 102 of FIGS. 9 and 10 and the architectural assembly 2 of FIG. 1 is that the latter relies on the substantially planar acoustic seal 108 for acoustic isolation along the sound flanking path 110 whereas the former relies on a pair of the substantially non-planar acoustic seals 8 to provide acoustic isolation. In FIG. 9, the architectural assembly 102 is shown in a default state in which the end wall 114 of the architectural separation 104 and the first interior side 130 of a mullion 106 have a nominal spacing. This will likely be the spacing that exists when the acoustic seal 108 is initially installed in the architectural assembly 102. In FIG. 10, the architectural assembly 102 is shown in a deflected state following relative movement between the architectural separation 104 and the mullion 106 that increases the spacing between the end wall 114 of the architectural separation and the first interior side 130 of the mullion.

It will be seen in FIG. 10 that the acoustic seal 108 is capable of undergoing offset flexing that allows one edge 152 of the elongated rail 135 to displace relative to its other edge 153 so as to become offset a direction that is normal to the first and second sealing surfaces 140 and 142. This results in the elongated rail cross-section becoming flexed proximate to first and second flex locations where the mid-span region 169 of elongated rail cross-section meets the first and second adhesive-bearing portions 166 and 168. This is the location where the offset slits 174 and 176 are formed. Due to the adhesive 164, the first seal surface 140 remains attached to and travels with the first interior side 130 of the mullion 106, and the second seal surface 146 remains attached to and travels with the end wall 114 of the architectural separation 114. The relatively low elastic modulus of the acoustic seal material allows the acoustic seal 108 to undergo offset flexing without undue resistance. The offset slits 174 and 176 further facilitate this offset flexing by virtue of being able to open.

Figure 11:
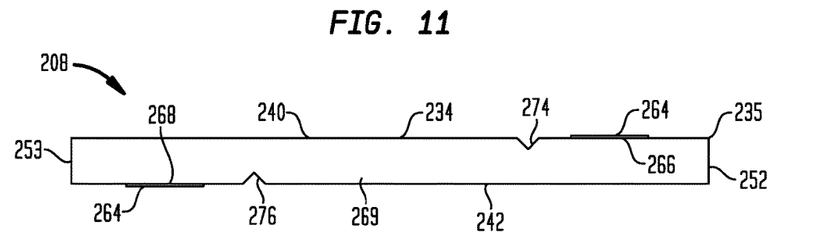
FIG. 11 is an end view of a second alternative acoustic seal that may be used in an architectural assembly to seal a sound flanking path between the end of an interior architectural separation and an interior face of a curtain wall or storefront mullion.
Figure 12:
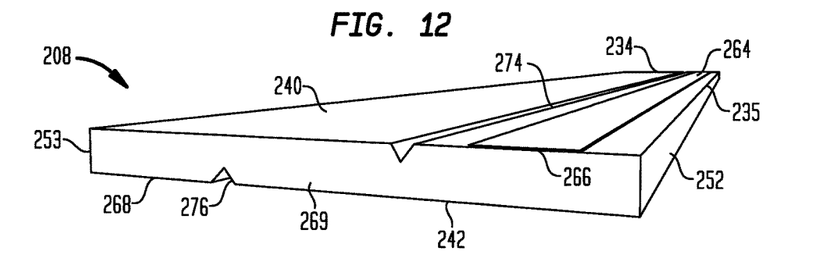
FIG. 12 is a top perspective view of the second alternative acoustic seal of FIG. 11.
Figure 13:
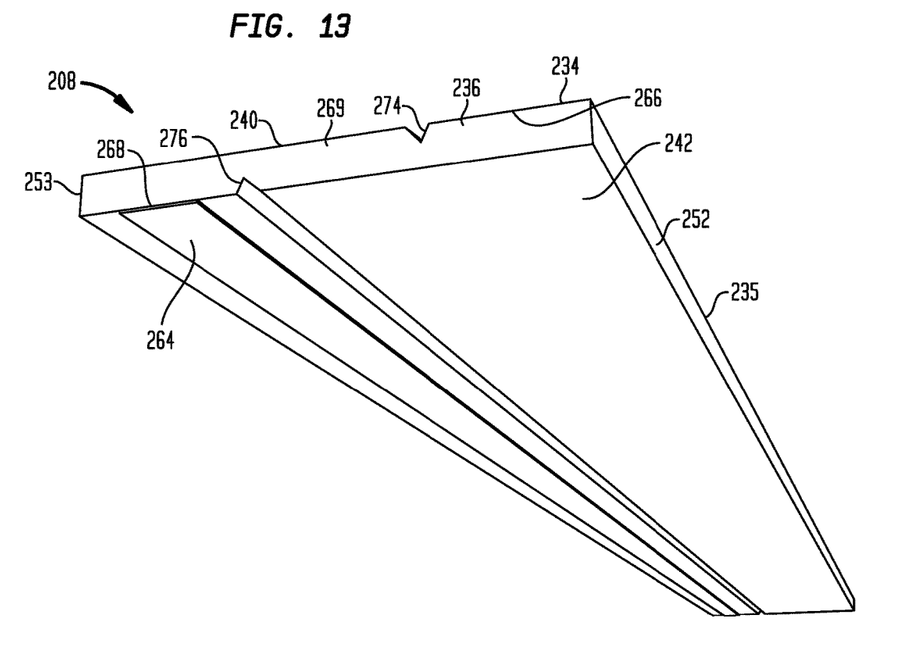
FIG. 13 is a bottom perspective view of the second alternative acoustic seal of FIG. 11.

Turning now to FIGS. 11-13, a second alternative acoustic seal 208 is shown that may be used to seal a sound flanking path between an the end of an interior architectural separation and an interior face of a curtain wall or storefront mullion. The acoustic seal 208 is identical to the acoustic seal 108 of FIGS. 6-8, except that the slits 174 and 176 have been replaced with channels shaped as v-shaped notches 274 and 276, thus providing an alternative type of stress-relief feature. All other features of the acoustic seal 208, as shown by the use of corresponding reference numbers incremented by 100.

Like the slits 174 and 176 of the acoustic seal 108, the notches 274 and 276 of the acoustic seal 208 facilitate offset flexing to accommodate relative movement between an interior architectural separation and a mullion. The first notch 274 may be formed in the first seal surface 240 at a flex location where the mid-span region 169 of the elongated rail cross-section meets the first adhesive-bearing portion 266. The second notch 276 may be formed in the second seal surface 242 at a flex location where the mid-span region 169 of the elongated rail cross-section meets the second adhesive-bearing portion 268. The notches 274 and 276 may be formed in any suitable manner, such as during formation of the acoustic seal 108 (e.g., using an extrusion or molding process).

The first and second notches 274 and 276 may have a depth that is sufficient to facilitate the acoustic seal's offset flexing. For example, in the illustrated embodiment, the first and second notches 274 and 276 extend approximately halfway through the thickness of the seal body 134. Each notch 270 and 276 may be spaced from the edge of the adjacent adhesive element 264 by the same distance the other edge of the adhesive element is from the closest longitudinal edge 252 or 253. In that way, each adhesive element 264 will be centered between a longitudinal slit and a longitudinal edge. For example, if the adhesive element 264 on the adhesive-bearing portion 266 is ⅛ inches away from the longitudinal edge 252, the notch 274 could be ⅛ inches away from the adhesive. The other adhesive element 164 could be similarly centered between the notch 276 and the longitudinal edge 253.

Figure 14:
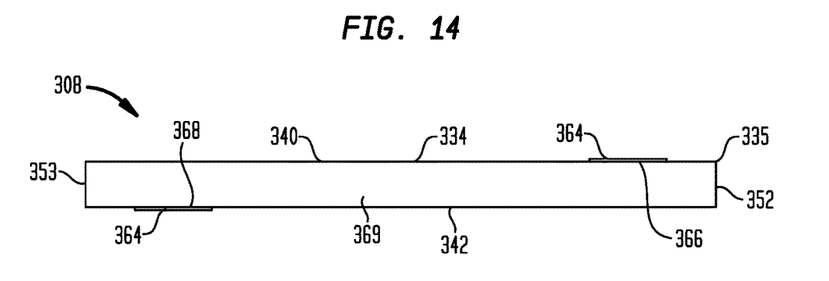
FIG. 14 is an end view of a third alternative acoustic seal that may be used in an architectural assembly to seal a sound flanking path between the end of an interior architectural separation and an interior face of a curtain wall or storefront mullion.
Figure 15:
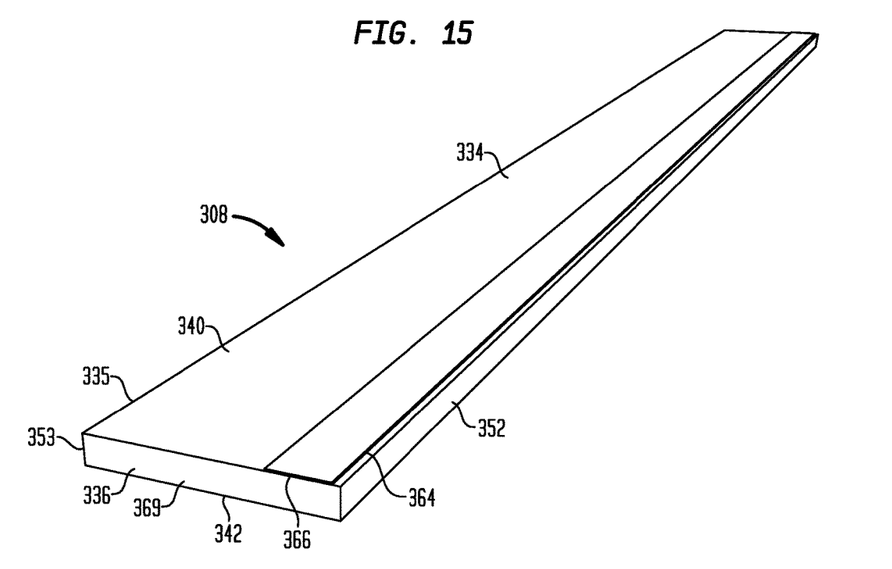
FIG. 15 is a top perspective view of the third alternative acoustic seal of FIG. 14.
Figure 16:
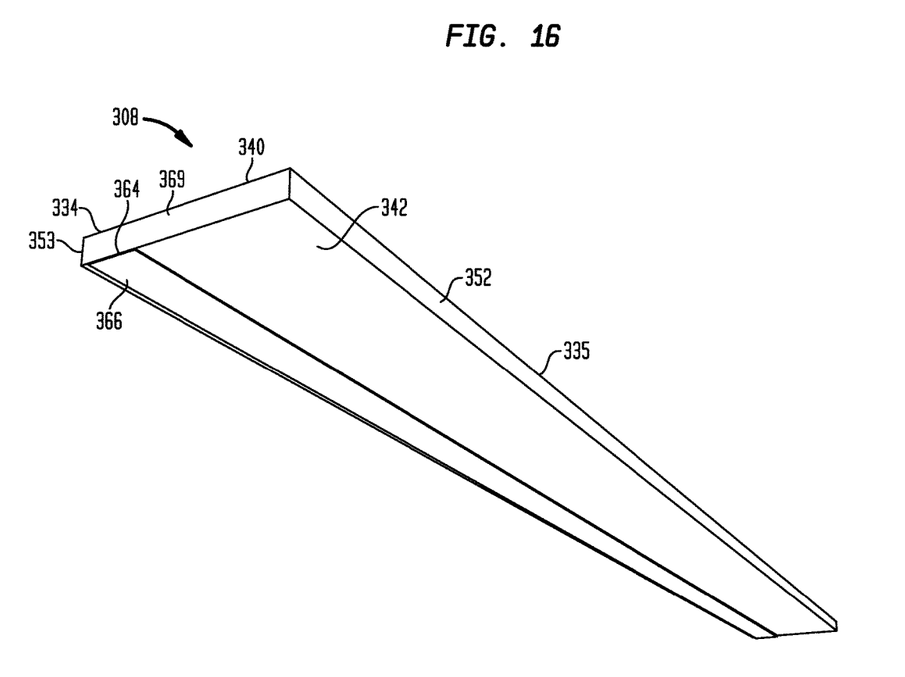
FIG. 16 is a bottom perspective view of the third alternative acoustic seal of FIG. 14.

Turning now to FIGS. 14-16, a second alternative acoustic seal 308 is shown that may be used to seal a sound flanking path between an the end of an interior architectural separation and an interior face of a curtain wall or storefront mullion. The acoustic seal 308 is identical to the acoustic seal 108 of FIGS. 6-8 and the acoustic seal 208 of FIGS. 11-13, except that there are no slits or channels. All other features of the acoustic seal 308, as shown by the use of corresponding reference numbers incremented by 100. Although there are no slits or notches (or other stress-relief features), the flexibility of the acoustic material used in the construction of the acoustic seal 308 is such that the seal has the ability to undergo offset flexing in order to accommodate relative movement between an interior architectural separation and a mullion.

Accordingly, an acoustic seal has been disclosed for sealing a sound flanking path between an interior architectural separation and a mullion, together with an architectural assembly that incorporates the acoustic seal and an architectural assembly construction method. While various embodiments of the invention have been described, it should be apparent that many variations and alternative embodiments could be implemented in accordance with applicant's invention. It is understood, therefore, that the invention is not to be in any way limited except in accordance with the spirit of the appended claims and their equivalents.

What is claimed is:

1. An acoustic seal for sealing a sound flanking path between an interior architectural separation and a mullion, comprising:
a solid seal body formed entirely from an elastomeric acoustic isolating material;
said seal body being configured as an elongated rail having a length and a substantially rectangular cross-section defined by a substantially uniform width and a substantially uniform thickness of said elongated rail;
said seal body having two substantially planar and mutually parallel sides extending the entire width of said cross-section, said sides being spaced from each other by a substantially uniform distance that defines said elongated rail thickness;
said seal body having two longitudinal edges spaced from each other by a substantially uniform distance that defines said elongated rail width;
a first one of said sides defining a first seal surface arranged to engage a first interior side of said mullion, and a second one of said sides defining a second seal surface arranged to engage an end wall of said interior architectural separation;
a discrete first adhesive element disposed on said first seal surface at a first adhesive-bearing portion of said elongated rail;
a discrete second adhesive element disposed on said second seal surface at a second adhesive-bearing portion of said elongated rail;
said first and second seal body adhesive-bearing portions being laterally offset and separated from each other by a mid-span region of said elongated rail cross-section that is free of adhesive on said first and second sides from said first adhesive element to said second adhesive element;
said first seal body adhesive-bearing portion being proximate to a first one of said elongated rail longitudinal edges and said second seal body adhesive-bearing portion being proximate to a second one of said elongated rail longitudinal edges;
said elongated rail being configured for attachment to opposing faces of said mullion and said end wall of said architectural separation by adhering said first adhesive element to a face of said first interior side of said mullion and by adhering said second adhesive element to a face of said architectural separation end wall;
said elongated rail being configured to maintain a non-deformed state when it is attached to said mullion and said architectural separation end wall with said opposing faces of said mullion and said architectural separation end wall being separated by a distance that equals said elongated rail thickness;
said elongated rail being configured to assume a deformed state when it is attached to said mullion and said architectural separation end wall with said opposing faces of said mullion and said architectural separation end wall being separated by a distance that is greater than said elongated rail thickness; and
said deformed state comprising said first and second elongated rail longitudinal edges becoming offset from each other in a direction normal to said first and second seal surfaces as a result of said first and second seal body adhesive-bearing portions being pulled in opposite directions due to said first adhesive element being adhered to said mullion, said second adhesive element being adhered to said architectural separation end wall, and said mid-span region of said elongated rail cross-section not being adhered to either said mullion or said architectural separation end wall, and said elongated rail cross-section becoming flexed proximate to first and second flex locations where said mid-span region of said elongated rail cross-section meets said first and second seal body adhesive-bearing portions.

2. The acoustic seal of claim 1, wherein said first and second adhesive elements comprise first and second adhesive strips.

3. The acoustic seal of claim 2, wherein each of said first and second adhesive strips extend along the entire length of said elongated rail.

4. The acoustic seal of claim 1, further including first and second stress-relief features respectively disposed on said first and second seal surfaces at said first and second flex locations.

5. The acoustic seal of claim 4, wherein said first and second stress-relief features comprise slits extending respectively from said first and second seal surfaces partially through said elongated rail thickness.

6. The acoustic seal of claim 5, wherein said slits extend through approximately half of said elongated rail thickness.

7. The acoustic seal of claim 4, wherein said first and second stress-relief features comprise notches extending partially through said elongated rail thickness.

8. An architectural assembly, comprising:
an interior architectural separation;
a mullion;
an acoustic seal sealing a sound flanking path between said interior architectural separation and said mullion, said acoustic seal comprising:
a solid seal body formed entirely from an elastomeric acoustic isolating material;
said seal body being configured as an elongated rail having a length and a substantially rectangular cross-section defined by a substantially uniform width and a substantially uniform thickness of said elongated rail;
said seal body having two substantially planar and mutually parallel sides extending the entire width of said cross-section, said sides being spaced from each other by a substantially uniform distance that defines said elongated rail thickness;
said seal body having two longitudinal edges spaced from each other by a substantially uniform distance that defines said elongated rail width;
a first one of said sides defining a first seal surface arranged to engage a first interior side of said mullion, and a second one of said sides defining a second seal surface arranged to engage an end wall of said interior architectural separation;
a discrete first adhesive element disposed on said first seal surface at a first adhesive-bearing portion of said elongated rail;
a discrete second adhesive element disposed on said second seal surface at a second adhesive-bearing portion of said elongated rail;
said first and second seal body adhesive-bearing portions being laterally offset and separated from each other by a mid-span region of said elongated rail cross-section that is free of adhesive on said first and second sides from said first adhesive element to said second adhesive element;
said first seal body adhesive-bearing portion being proximate to a first one of said elongated rail longitudinal edges and said second seal body adhesive-bearing portion being proximate to a second one of said elongated rail longitudinal edges;
said elongated rail being attached to opposing faces of said mullion and said end wall of said architectural separation by virtue of said first adhesive element being adhered to a face of said first interior side of said mullion and by said second adhesive element being adhered to a face of said architectural separation end wall;
said elongated rail maintaining a non-deformed state when said opposing faces of said mullion and said architectural separation end wall are separated by a distance that equals said elongated rail thickness;
said elongated rail assuming a deformed state when said opposing faces of said mullion and said architectural separation end wall are separated by a distance that is greater than said elongated rail thickness; and
said deformed state comprising said first and second elongated rail longitudinal edges becoming offset from each other in a direction normal to said first and second seal surfaces as a result of said first and second seal body adhesive-bearing portions being pulled in opposite directions due to said first adhesive element being adhered to said mullion, said second adhesive element being adhered to said architectural separation end wall, and said mid-span region of said elongated rail cross-section not being adhered to either said mullion or said architectural separation end wall, and said elongated rail cross-section becoming flexed proximate to first and second flex locations where said mid-span region of said elongated rail cross-section meets said first and second seal body adhesive-bearing portions.

9. The architectural assembly of claim 8, wherein said first and second adhesive elements comprise first and second adhesive strips.

10. The architectural assembly of claim 9, wherein each of said first and second adhesive strips extend along the entire length of said elongated rail.

11. The architectural assembly of claim 8, further including first and second stress-relief features respectively disposed on said first and second seal surfaces at said first and second flex locations.

12. The architectural assembly of claim 11, wherein said first and second stress-relief features comprise slits extending respectively from said first and second seal surfaces partially through said elongated rail thickness.

13. The architectural assembly of claim 12, wherein said slits extend through approximately half of said elongated rail thickness.

14. The architectural assembly of claim 11, wherein said first and second stress-relief features comprise notches extending partially through said elongated rail thickness.

15. An architectural assembly construction method, comprising:
providing an acoustic seal for sealing a sound flanking path between an interior architectural separation and a mullion, said acoustic seal comprising:
a solid seal body formed entirely from an elastomeric acoustic isolating material;
said seal body being configured as an elongated rail having a length and a substantially rectangular cross-section defined by a substantially uniform width and a substantially uniform thickness of said elongated rail;
said seal body having two substantially planar and mutually parallel sides extending the entire width of said cross-section, said sides being spaced from each other by a substantially uniform distance that defines said elongated rail thickness;
said seal body having two longitudinal edges spaced from each other by a substantially uniform distance that defines said elongated rail width;
a first one of said sides defining a first seal surface arranged to engage a first interior side of said mullion, and a second one of said sides defining a second seal surface arranged to engage an end wall of said interior architectural separation;

a discrete first adhesive element disposed on said first seal surface at a first adhesive-bearing portion of said elongated rail;

a discrete second adhesive element disposed on said second seal surface at a second adhesive-bearing portion of said elongated rail;

said first and second seal body adhesive-bearing portions being laterally offset and separated from each other by a mid-span region of said elongated rail cross-section that is free of adhesive on said first and second sides from said first adhesive element to said second adhesive element;

said first seal body adhesive-bearing portion being proximate to a first one of said elongated rail longitudinal edges and said second seal body adhesive-bearing portion being proximate to a second one of said elongated rail longitudinal edges;

said elongated rail being configured for attachment to opposing faces of said mullion and said end wall of said architectural separation by adhering said first adhesive element to a face of said first interior side of said mullion and by adhering said second adhesive element to a face of said architectural separation end wall;

said elongated rail being configured to maintain a non-deformed state when it is attached to said mullion and said architectural separation end wall with said opposing faces of said mullion and said architectural separation end wall being separated by a distance that equals said elongated rail thickness;

said elongated rail being configured to assume a deformed state when it is attached to said mullion and said architectural separation end wall with said opposing faces of said mullion and said architectural separation end wall being separated by a distance that is greater than said elongated rail thickness; and said deformed state comprising said first and second elongated rail longitudinal edges becoming offset from each other in a direction normal to said first and second seal surfaces as a result of said first and second seal body adhesive-bearing portions being pulled in opposite directions due to said first adhesive element being adhered to said mullion, said second adhesive element being adhered to said architectural separation end wall, and said mid-span region of said elongated rail cross-section not being adhered to either said mullion or said architectural separation end wall, and said elongated rail cross-section becoming flexed proximate to first and second flex locations where said mid-span region of said elongated rail cross-section meets said first and second seal body adhesive-bearing portions;

attaching said acoustic seal to said mullion with said first adhesive element engaging an opposing face of said mullion; and attaching said interior architectural separation end wall to said acoustic seal with said second adhesive element engaging an opposing face of said end wall.

16. The architectural assembly construction method of claim 15, wherein said first and second adhesive elements comprise first and second adhesive strips.

17. The architectural assembly construction method of claim 16, wherein each of said first and second adhesive strips extend along the entire length of said elongated rail.

18. The architectural assembly construction method of claim 15, further including first and second stress-relief features respectively disposed on said first and second seal surfaces at said first and second flex locations.

19. The architectural assembly construction method of claim 18, wherein said first and second stress-relief features comprise slits extending respectively from said first and second seal surfaces partially through said elongated rail thickness.

20. The architectural assembly construction method of claim 19, wherein said slits extend through approximately half of said elongated rail thickness.

21. The architectural assembly construction method of claim 18, wherein said first and second stress-relief features comprise notches extending partially through said elongated rail thickness.

\* \* \* \* \*